(12) United States Patent
Nagao

(10) Patent No.: US 7,200,808 B1
(45) Date of Patent: Apr. 3, 2007

(54) ELECTRONIC DOCUMENT PROCESSOR

(75) Inventor: Katashi Nagao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/282,349

(22) Filed: Mar. 31, 1999

(30) Foreign Application Priority Data

Apr. 2, 1998 (JP) .................................. 10-089758
Feb. 9, 1999 (JP) .................................. 11-031550

(51) Int. Cl.
G06F 15/00 (2006.01)
(52) U.S. Cl. ...................... 715/514; 715/517; 715/530; 707/10
(58) Field of Classification Search ................. 707/10, 707/514, 526; 715/514, 517, 530
See application file for complete search history.

(56) References Cited

U.S. PATENT DOCUMENTS

| | | | | |
|---|---|---|---|---|
| 4,864,501 A | | 9/1989 | Kucera et al. ............... 364/419 |
| 5,010,581 A | * | 4/1991 | Kanno ......................... 382/284 |
| 5,077,668 A | | 12/1991 | Doi ............................. 364/419 |
| 5,384,703 A | | 1/1995 | Withgott et al. ....... 364/419.19 |
| 5,533,186 A | * | 7/1996 | Tanahashi et al. .......... 345/549 |
| 5,623,679 A | * | 4/1997 | Rivette et al. .............. 707/522 |
| 5,691,708 A | * | 11/1997 | Batchelder et al. ......... 340/7.29 |
| 5,867,164 A | * | 2/1999 | Bornstein et al. ........... 345/854 |
| 5,913,215 A | * | 6/1999 | Rubinstein et al. ........... 707/10 |
| 5,963,205 A | * | 10/1999 | Sotomayor .................. 707/531 |
| 6,029,180 A | * | 2/2000 | Murata et al. ........... 707/501.1 |
| 6,175,830 B1 | * | 1/2001 | Maynard ........................ 704/9 |
| 6,334,132 B1 | * | 12/2001 | Weeks ......................... 707/100 |

OTHER PUBLICATIONS

Zechner, Klaus, "Fast Generation of abstracts from general domain text corpora by extracting relevant sentences", Association of Computational Linguistics, International Conference on Computational Linguistics—vol. 2, Denmark, pp. 986-989, 1996.*

Zechner, Klaus, "Fast Generation of Abstracts from General Domain Text Corpora by Extracting Relevant Sentences", International Conference On Computational Linguistics archive, Proceedings of the 16th conference on Computational linguistics—vol. 2, pp. 986-989, 1996.*

* cited by examiner

Primary Examiner—Heather R. Herndon
Assistant Examiner—R. Singh
(74) Attorney, Agent, or Firm—Frommer Lawrence & Haug LLP; William S. Frommer; Thomas F. Presson

(57) ABSTRACT

An electronic document processor is provided in which a controller sets a size of an abstract display area, in an entire display area, according to an input supplied to an input unit, determines an abstract length based on the set abstract display area size, generates, from an electronic document, an abstract having a length which falls within the abstract display area, and displays the generated abstract in the set abstract display area.

7 Claims, 13 Drawing Sheets

Mr. A's memorial assembly B was held and over in the C City. Some of the newspaper companies, tabloid and oridinary, announced, on their papers, their intentions to control themselves in the photojournalism

<document><sentence><adverb Relation = "place"><noun phrase><adverb phrase Place = "C市 ">
<adverb phrase Relation = "subject"><noun phrase Identifier ="B会"><adverb Relation = "position">A氏の</adverb phrase>B会</noun phrase>が</adverb phrase>
終わった</adverb phrase><place name Identifier ="C市">C市</place name></noun phrase>で</adverb phrase><adverb phrase Relation= "subject"><noun phrase Identifier = "新聞" Syntax = "parallal"><noun phrase><adverb phrase>一部の</adverb phrase>大衆紙</noun phrase>と<noun >一般紙</noun></noun phrase>が
<adverb phrase><adverb phrase Relation = "object"><adverb Relation ="content" Subject = "新聞"><adverb Relation ="object><noun phrase><adverb phrase><noun Coreference ="B">そ</noun>の</adverb phrase>写真報道</noun phrase>を</adverb phrase>
自主規制する</adverb phrase>方針を</adverb phrase>
<adverb phrase Relation = "plase">紙面で</adverb phrase>
明らかにした</sentence></ducument>

FIG.3C

ELECTRONIC DOCUMENT PROCESSOR

BACKGROUND OF THE INVENTION

1. Field of the Invention

The present invention relates to an electronic document processing.

2. Description of Related Art

Conventionally, the World Wide Web (WWW) has been used over the Internet as an application service to serve electronic information in the form of a window.

As well known, the WWW provides a new style of electronic document processing to generate, publicize or commonly use an electronic document. However, it has been demanded that an electronic document can be sorted and summed up or abstracted based on its content, namely, a higher level of electronic document processing than by the WWW has been demanded. For this high level of electronic document processing, it is indispensable to mechanically process the content of an electronic document.

However, such a mechanical processing of the content of an electronic document is difficult for the following reasons. Firstly, the HTML (Hyper Text) Markup Language) prescribes the presentation of an electronic document, but little the content of the electronic document. Secondly, not all electronic networks formed between electronic documents are easily usable by all the readers of the electronic documents to understand the contents of the documents. Thirdly, an author of a document usually writes an electronic document without bearing in mind the convenience of the readers of the electronic document, and the convenience of the readers of an electronic document is not coordinated with that of the author of the electronic document.

As mentioned above, the WWW is a new electronic system, but since it does not mechanically process an electronic document, no high level of electronic document processing can be attained. In other words, it is necessary to mechanically process an electronic document in order to execute the high level of electronic document processing.

For such a mechanical document processing, a system for supporting the mechanical document processing has been developed on the basis of the results of the natural language studies. As a document processing developed through the natural language studies, a mechanical document processing has been proposed which makes the use of tags added to a document on the assumption that attribute information, so-called tags, are additionally used in the internal structure of a document stated by an author.

Incidentally, the user utilizes an information retrieval system such as a search engine, for example, to search for a desired information in vast amounts of information served over the Internet. This information retrieval system searches for the information based on a designated keyword and serves the retrieved information to the user. The user selects desired information from the served information.

Information can thus easily be retrieved, but the user has to read through the information served by the information retrieval system, get the tenor thereof and judge whether it is his or her desired information, which will be very burdensome to the user especially when the amount of information thus served to him is large. To lessen this burden to the user, a system for automatically abstracting or summing up a document information, that is, the document content, a so-called automatic abstract generation system, has recently been attracting much attention in this field of art.

The automatic abstract generation system generates an abstract from an electronic document by reducing the length and complexity of the electronic information while maintaining the original information included in the electronic document, and thus helps the user to get the tenor of the document by reading through the abstract.

Normally, the automatic abstract generation system weights each of sentences and words in a text based on a certain information and places them in their weighted order of significance. The sentences and words placed in higher order are collected together to generate an abstract.

Although the automatic abstract generation system can easily generate an abstract from a document in this way, the amount of information included in an abstract generated by the automatic abstract generation system depends upon the amount of information in the document, method of weighting the sentences and words, etc. For example, when an abstract is too simple for the user to get the tenor of the document, the user cannot refer to any further detailed abstract.

SUMMARY OF THE INVENTION

It is therefore an object of the present invention to overcome the above-mentioned drawbacks of the prior art by providing an electronic document processing apparatus and method adapted to generate an abstract meeting user's requirements.

The above object can be achieved by providing an electronic document processor, comprising according to the present invention:

means for variably setting a size of an abstract display area, in an entire display area, for display of an abstract to be generated from an electronic document;

means for determining a length of an electronic document abstract to be generated based on the abstract display area size set by the setting means;

means for generating, from an electronic document, an abstract having a length which depends upon the electronic document abstract length determined by the determining means and falls within the abstract display area; and a display controlling means for displaying the abstract generated by the generating means in the abstract display area.

Also, the above object can be achieved by providing an electronic document processing method comprising, according to the present invention, the steps of:

variably setting a size of an abstract display area, in an entire display area, for display of an abstract to be generated from an electronic document;

determining an electronic document abstract length based on the set abstract display area size;

generating, from an electronic document, an abstract having a length which depends upon the determined electronic document abstract length and falls within the abstract display area; and displaying the generated abstract in the abstract display area.

The above object can be achieved also by providing a recording medium having a computer-readable electronic document processing program recorded therein, the electronic document processing program comprising, according to the present invention, the steps of:

variably setting a size of an abstract display area, in an entire display area, for display of an abstract to be generated from an electronic document;

determining an electronic document abstract length based on the set abstract display area size;

generating, from an electronic document, an abstract having a length which depends the determined electronic document abstract length and falls within the abstract display area; and displaying the generated abstract in the abstract display area.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 3A shows an example of document in English;

FIG. 3B shows a Japanese version of the document in FIG. 3A;

FIG. 3C shows an example of tagged internal structure of the document in FIG. 3B;

DETAILED DESCRIPTION OF THE PREFERRED EMBODIMENTS

Figure 1:
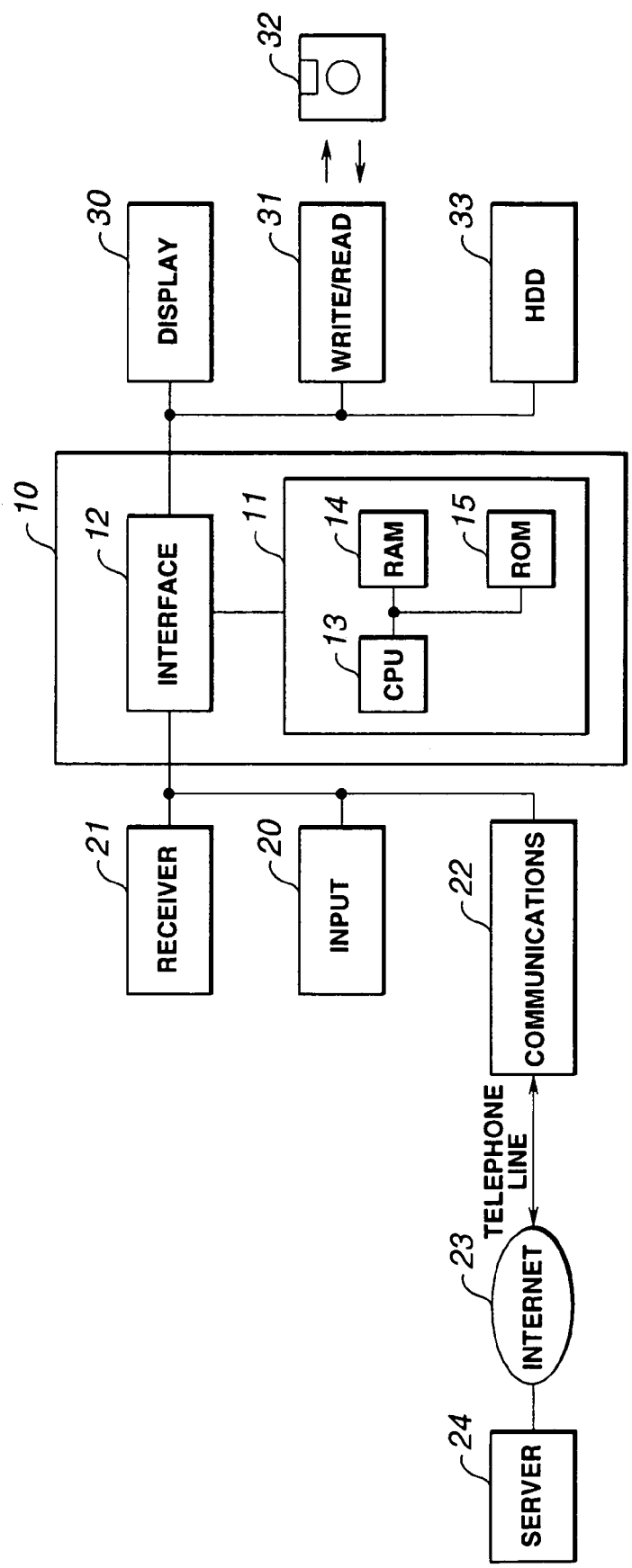
FIG. 1 is a schematic block diagram of an embodiment of the electronic document processor according to the present invention.

Referring now to FIG. 1, an embodiment of the electronic document processor according to the present invention is illustrated in the form of a schematic block diagram. As shown, the electronic document processor comprises a body 10 incorporating a controller 11 and interface 12, an input unit 20 which receives an input supplied from the user and passes it to the body 10, a receiver 21 which receives an external signal and passes it to the body 10, a communication unit 22 to deal with communications between a server 24 and body 10, a display unit 30 to display an output from the body 10, a write/read unit 31 to write and read information to and from a recording medium 32, and a hard disc drive (HDD) 33.

Consisting of the controller 11 and interface 12, the body 10 serves as the core of the electronic document processor. The controller 11 includes a CPU 13 to control all the operations done in the electronic document processor, a RAM 14 which is a volatile memory, and a ROM 15 which is a nonvolatile memory. The CPU 13 provides such a control that, for example, a procedure stored in the ROM 15 is followed to run the electronic document processing program with data temporarily stored in the RAM 14 when necessary. The interface 12 has connected thereto the input unit 20, receiver 21, communication unit 23, display unit 30, write/read unit 31 and HDD 33. Under the control of the controller 11, the interface 12 adjusts data transmission timing and changes data format for data entry from the input unit 20 and receiver 21 and data transmission to the display unit 30.

The input unit 20 receives a user input supplied to the electronic document processor. It consists of a keyboard, mouse, etc., for example. Using the input unit 20, the user can enter a keyword from the keyboard and use the mouse to selectively enter a document element, namely, text information, displayed on the display unit 30. The "document element" referred to herein includes sentences and words composing a document.

The receiver 21 receives an external signal sent via a communications network, for example, to the electronic document processor. It receives a plurality of electronic documents and passes the received data to the body 10.

The communication unit 17 comprises a modem, terminal adapter, etc., for example. It is connected to the Internet 23 via a telephone line, and can thus access the server 24 connected to the Internet 23 and receive data from the server 24.

The display unit 30 displays an output from the electronic document processor. It is composed of a CRT (cathode ray tube) or LCD (liquid crystal display). It provides one or more than one window in which characters, figures, etc. are displayed.

The write/read unit 31 is controlled by the controller 11 of the electronic document processor to write and read information to and from the recording medium 32 such as a so-called floppy disc. The recording medium 32 has recorded therein a program to process an electronic document. The recording medium 32 will further be described later. The HDD 33 is used to write and read data to and from a hard disc which is a large-capacity magnetic recording medium.

The electronic document processor constructed as mentioned in the above functions as will be described below:

First, the user operates the input unit 15 to run a program for communications over the Internet 23 and enter URL (Uniform Resource Locater) of the server 24 (search engine). Then, the controller 11 will control the communication unit 22 to access the server 24. The server 24 will provide a retrieval screen data to the communication unit 22 in the electronic document processor via the Internet 23. The CPU 13 provides the data to the display unit 30 which will display it. When the user enters a keyword on the retrieval screen to direct a retrieval, a retrieval instruction is transmitted to the server 34 as a search engine via the Internet 23.

The server 24 receives and executes the retrieval instruction and transmits a retrieval result to the communication unit 22 via the Internet 23. The controller 11 will control the communication unit 21 to receive the retrieval result from the server 23 and the display unit 30 to display a part of the retrieval result. In this case, the server 23 transmits various data including a keyword of "TCP" to the communication unit 21 and a following document, for example, is displayed on the display unit 16.

"It is not too much to say that the history of TCP/IP (Transmission Control Protocol/Internet Protocol) is the history of the computer networks rather over the world than in the North America. Also, the history of TCP/IP could not stand without ARPANET. ARPANET is an acronym for Advanced Research Project Agency Network. Now, ARPANET is a very wide area network for the free packet exchange for experiments and researches, but when created by the U.S. Department of Defense Advanced Research Project Agency (DARPA) as a sponsor in 1969, it was only a very small-scale network connecting, by 50-kbps lines, universities and research institutes at 4 sites in the West Coast of the North America.

In 1945, ENIAC, a world first computer, was made by the Pennsylvania University. In 1964, IBM developed the 360 series computers having logical devices adopted therein and having marked the history of the third-generation computers. Namely, it was not long after the computers were introduced to the world that ARPANET was created. In these circumstances, which other country than the United States of America would have had such a project as ARPANET started as if they anticipated the recent flourishing computer communications?"

This document has the internal structure stated with tagged attribute information. In this electronic document processor, a document is processed referring to tags added to the document. In this embodiment, syntactic tags indicating the structure of a document and semantic and pragmatic tags enabling mechanical understanding of the content of the document between multiple languages, are added to the document.

Figure 2:
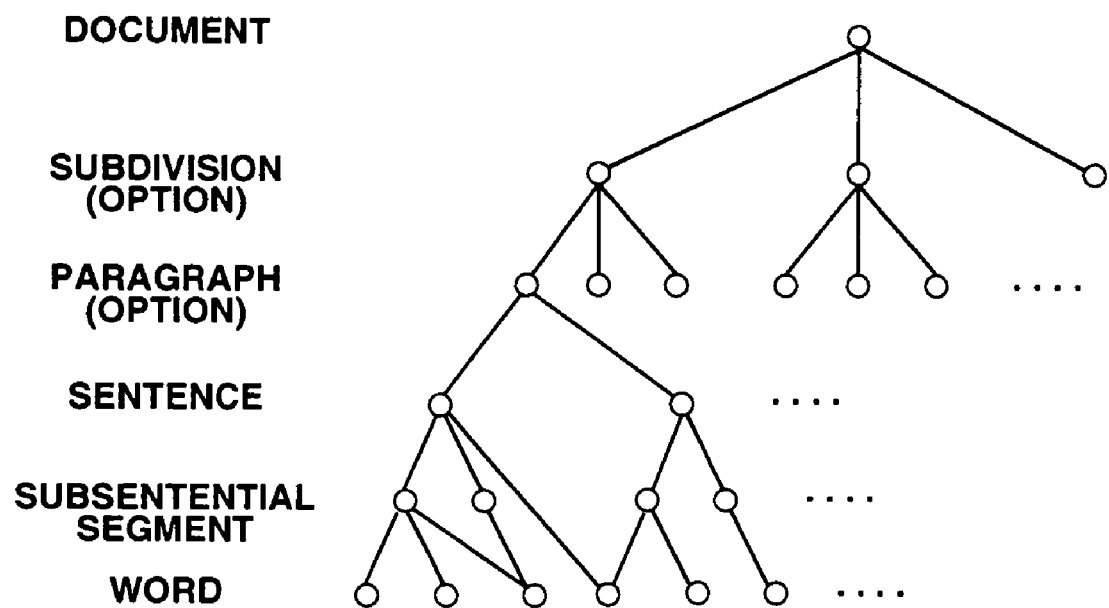
FIG. 2 shows the internal structure of a document.

In this embodiment, a syntactic tagging is done to state an internal structure of a document in the form of a tree. That is, in the electronic document processor according to the present invention, a document has added thereto each of elements of the internal structure, document, sentence and glossary element, normal link, referring and referenced links, etc. as tags as shown in FIG. 2. In FIG. 2, small circles denote document elements such as glossaries, segments, sentences, etc. The circles at the bottom denote glossary elements corresponding to minimum-level words in a document. The solid lines denote normal links indicating links between elements such as words, phrases, paragraphs, sentences, etc. The dash lines denote referring links indicating connections arisen by reference. The internal structure of a document is composed of, in a descending order, a document, an optional sub-division being a subordinate element of the document and also a superordinate element of a paragraph, an optional paragraph, a sentence, a sub-sentential segment being a subordinate element, and an undermost glossary element.

This embodiment uses a tagging for a syntactic structure indicating an interconnection, for example, a referent of a pronoun and a tagging for semantic information such as a sense of a multisense word. In this embodiment, the tagging is done as in HTML (Electronic Markup Language) as well as in XML (Extended Markup Language).

An example of tagged internal structure of a document is shown below. However, the document tagging is not of course limited only to this method.

Here is a sentence "Time flies like an arrow", for example. This sentence may be tagged as in the following.
   <sentence><noun_phrase sense="time0">time</noun_phrase>
   <verb_phrase><verb sense="fly1">flies</verb>
   <adverb phrase>;adverb sense=like0>like</adverb><noun>_phrase>an
   <noun sense="arrow0">arrow</noun></noun_phrase>
   </adverb></verb_phrase>,</sentence>

In the above, <sentence>, <noun>, <noun_phrase>, <verb>, <verb_phrase> and <adverb> denote sentence syntactic structures such as a sentence, noun phrase, verb, verb phrase, adjective/adjective phrase including a preposition phrase and postposition, and an adjective phrase/adjective verb phrase. The tags (angle brackets) begin with a start tag (delimited with <>), followed by the content or element, and end with an end tag (delimited with </>. The "/" in the end tag (</>) indicates a minimum unit of element of a sentence, namely, the end of an element. This element indicates a syntactic structure element, that is, a phrase, paragraph or sentence. The sense=time0 indicates that the sense of the element is a 0-th one of a plurality of senses the element has. More particularly, "time" is a noun and also a verb. The "time0" indicates that the "time" is used as a noun". For example, a term "orange" has two senses, namely, "orange color" and also "orange fruit", which can be distinguished from each other by such tagging.

Figure 3D:
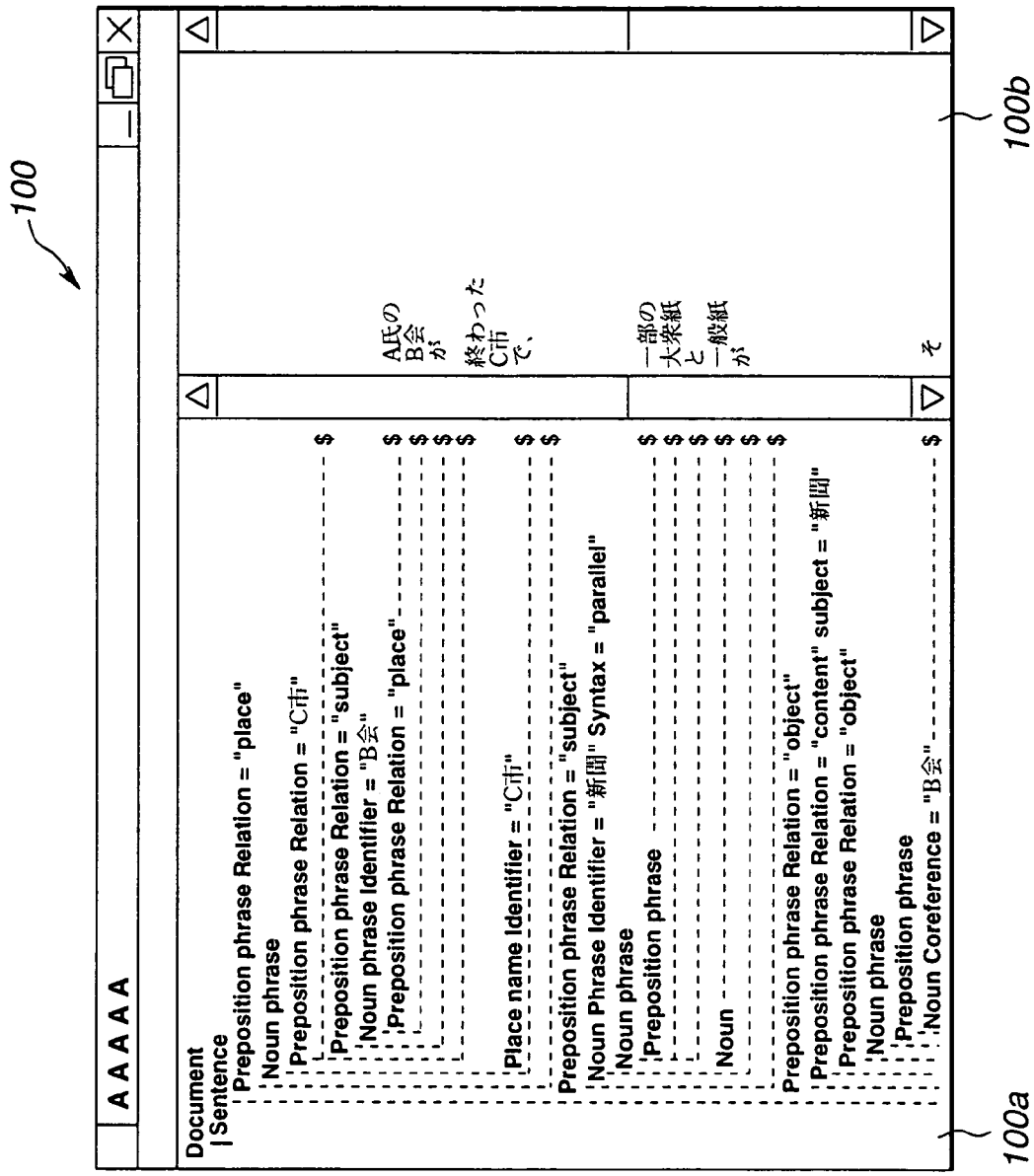
FIG. 3D shows a window displaying a tagged internal structure.

Another example of document is shown in FIG. 3A and a Japanese version of the document in FIG. 3A is shown in FIG. 3B. As in the example of document of which the tagging has been described in the above, the document in FIG. 3B is tagged as in FIG. 3C. This document can have a syntactic structure as shown in a window 100 in FIG. 3D. A right half frame 100*b* of the window 100 displays glossary elements of the document while a left half frame 100*a* displays the sentence structure. Namely, a document in any other language can be tagged.

As in FIG. 3A, the window 100 displays in the left half frame 100*a* thereof a tagged syntactic structure of a document "Mr. A's memorial assembly B was held and over in the C City. Some of the newspaper companies, tabloid and ordinary, announced, on their papers, their intentions to control themselves in the photojournalism."

In the above document, the "tabloid" and "ordinary" in the "Some of the newspaper companies, tabloid and ordinary" are shown by tags of semantic="parallel" to have a connection between them. Unless otherwise specified "<noun phrase Relation=x><noun>A</noun><noun>B/noun></noun_phrase>" shows that there is a dependence between A and B. The "Relation=x" indicates the relative attribute of the <noun phrase> element.

Next, relative attributes stating a relation among the syntax, semantic and rhetoric in tagging will be described.

The relative attributes are used to express grammatical functions such as a subject, object and indirect object, subjective functions such as agentive, affective, benefactive, etc. and rhetoric relations such as reason, result, etc. A relative attribute is expressed in the form of relation=***. In this embodiment, relative attributes are stated concerning relatively simple grammatical functions, namely, a function of a word such as a subject, object or indirect object in a sentence.

Next, a method of generating an abstract of the above-mentioned tagged document will be described below. First, the abstract generation will be briefed with reference to a flow chart shown in FIG. 4, and also will be further described later with reference to FIG. 8. To generate an abstract of the aforementioned document displayed on the display unit 30, the user operates the input unit 20 to enter a command for an automatic abstract generation mode. The controller 11 will carry out the steps of operations as in FIG. 4 when the command is entered.

Figure 5:
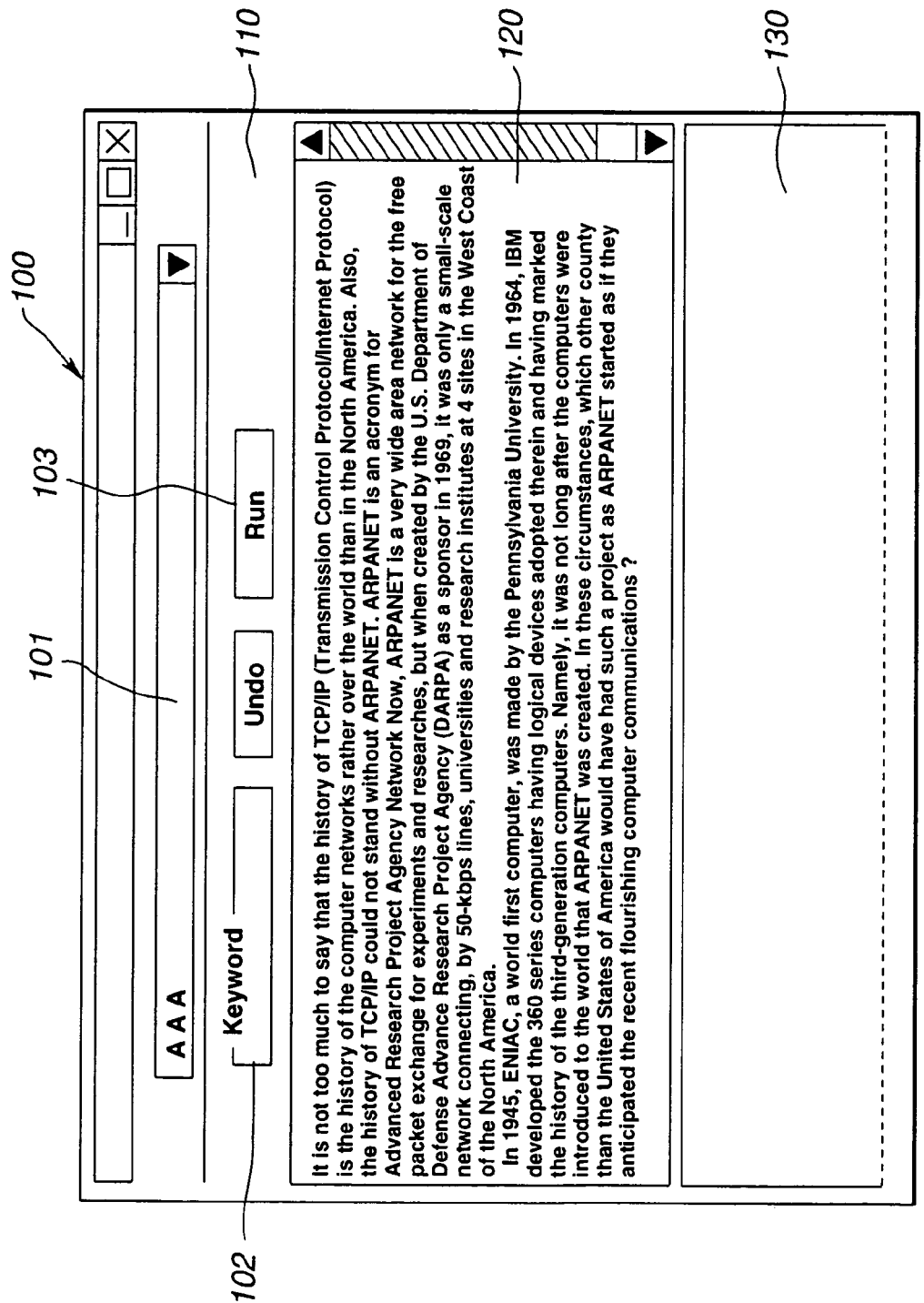
FIG. 5 shows a window in which an original document is displayed.

First at step S1, the controller 11 puts into run an automatic abstract generation program stored in the HDD 33 and controls the display unit 30 to display an initial screen of the automatic abstract generation program as shown in FIG. 5. In this example, the screen of the display unit 30 displays a window 100 consisting of an upper display frame 110 having a document name indication area 101, keyword input area 102 and a RUN button 103, a middle display frame 120 in which a document is displayed, and a lower display area 130 in which an abstract of the document is displayed.

A name of a document displayed in the middle display frame 120 is indicated in the document name indication area 101 of the upper display frame 110. A keyword is entered in the keyword input area 102. When a keyword is entered in the keyword input area 102, an abstract is generated from a document displayed in the middle display frame 120 correspondingly to the entered keyword. When the RUN button 103 is turned on, the abstract generation program for the document displayed in the middle display frame 120 is put into run.

A document is displayed in the middle display frame 120. In this case, the aforementioned document is displayed there. The user may operate the input unit 20 to select a part of the document for summing up, or sum up the entire document. The document displayed in the middle display frame 120 can be scrolled in the directions of arrows by operating the arrow marks provided at the right upper and lower portions of the middle display frame 120.

Figure 6:
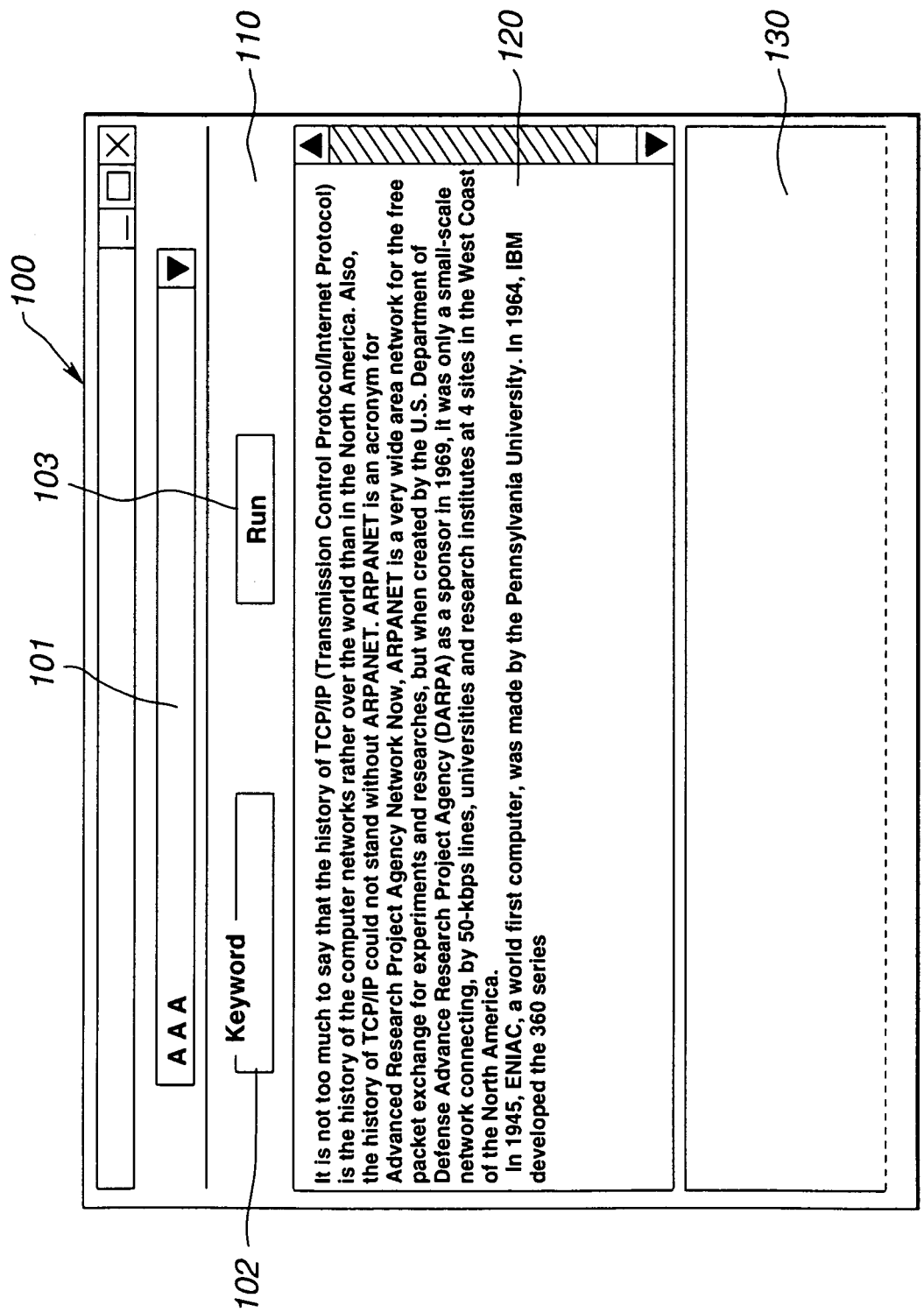
FIG. 6 shows a window in which the original document is displayed.

The lower display area 130 displays a generated abstract. Since no abstract is not yet generated at present, nothing is displayed in the area 130. The user can operate the input unit 20 to change the display range (size) of the lower display area 130. FIG. 6 shows the lower display area 130 of which the range is extended.

Next at step S2, the user operates the input unit 20 and turns on the RUN button 103 in the upper display frame 110. Then at step S3, the controller 11 follows a predetermined rule to weight each elements such as sentences and words in the document and supply the elements along with their weights to the RAM 14 where they will be stored. This weighting may be done by a Zechner-proposed method in which each of words in a sentence is weighted by the tf*idf method and the sum of the words' weighted significance appearing in the sentence is taken as the significance of the sentence, and a method in which the activation propagation is used. The former method is referred in detail to the following document.

K. Zechner, "Fast Generation of Abstracts from General Domain Text Corpora by Extracting Relevant Sentences" In Proc. of the 16th International Conference on Computational Linguistics, pp. 986–989, 1996.

It should be noted that the weighting may be done by any other method. Also, by entering a keyword into the keyword input area 102 of the upper display frame 110, an element can be weighted based on the entered keyword.

At step S4, the controller 11 measures the size of display range of the lower display frame 130, and at step S5, it determines a length (number of characters, for example) of an abstract displayed in the lower display frame 130 based on the measurement result and a previously designated character size.

Next at step S6, the controller 11 will select sentences or words in the order of weighted significance from the RAM 13 in such a manner that an abstract to be generated will not have a larger number of characters than determined at step S5.

At step S7, the controller 11 will bring into connection the sentences or words selected at step S6 to generate and display an abstract in the lower display frame 130 of the display unit 30.

Figure 7:
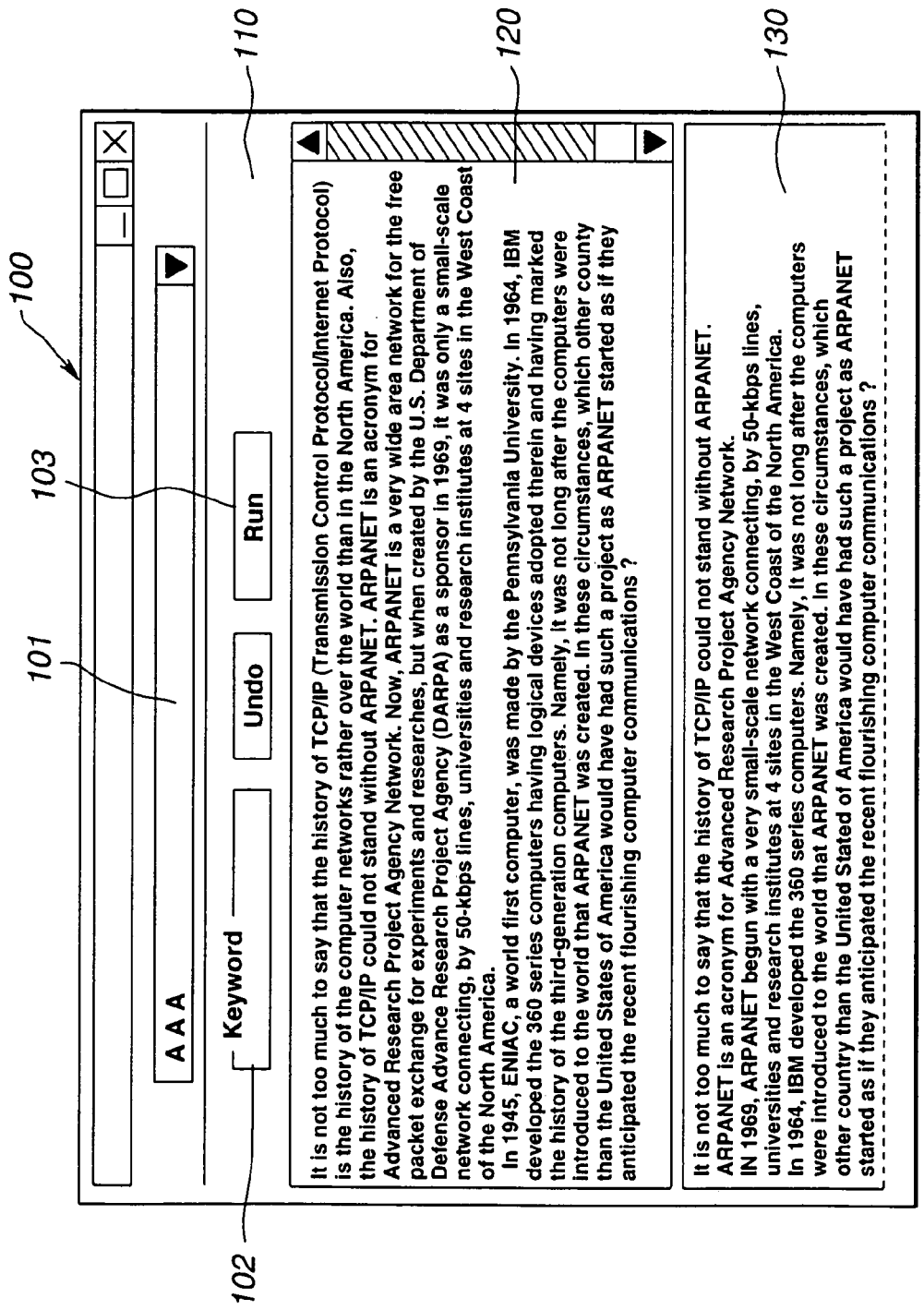
FIG. 7 shows a window in which the document and its abstract are displayed.

Thus, a following example of abstract is displayed in the lower display frame 130 as in FIG. 7.

"It is not too much to say that the history of TCP/IP could not stand without ARPANET. ARPANET is an acronym for Advanced Research Project Agency Network. In 1969, ARPANET begun with a very small-scale network connecting, by 50-kbps lines, universities and research institutes at 4 sites in the West Coast of the North America. In 1964, IBM developed the 360 series computers. Namely, it was not long after the computers were introduced to the world that ARPANET was created. In these circumstances, which other country than the United States of America would have had such a project as ARPANET started as if they anticipated the recent flourishing computer communications?"

The user reads this abstract to get the tenor of the document, instead of reading the entire document, and thus he or she can judge whether the document is his or her desired information.

Next, another example of the abstract generation procedure will be described herebelow with reference to the flow chart in FIG. 8. A series of operations is started by turning on the RUN button 103.

The abstract generation from a document is effected based on the tags added to the internal structure of the document. As aforementioned, the lower display frame 130 of the window 100 in which an abstract is displayed can be changed in size. When a new document name is indicated in the indication area 101 of the window 100 of the display unit 30, or when the lower display frame 130 is changed in size and thereafter the RUN button 103 is turned on, the controller 11 of the electronic document processor of the present invention runs the abstract generation from a document of which at least a part is displayed in the middle display frame 120 of the window 100 in such a manner that the abstract can fully be displayed within the lower display frame 130.

Figure 8:
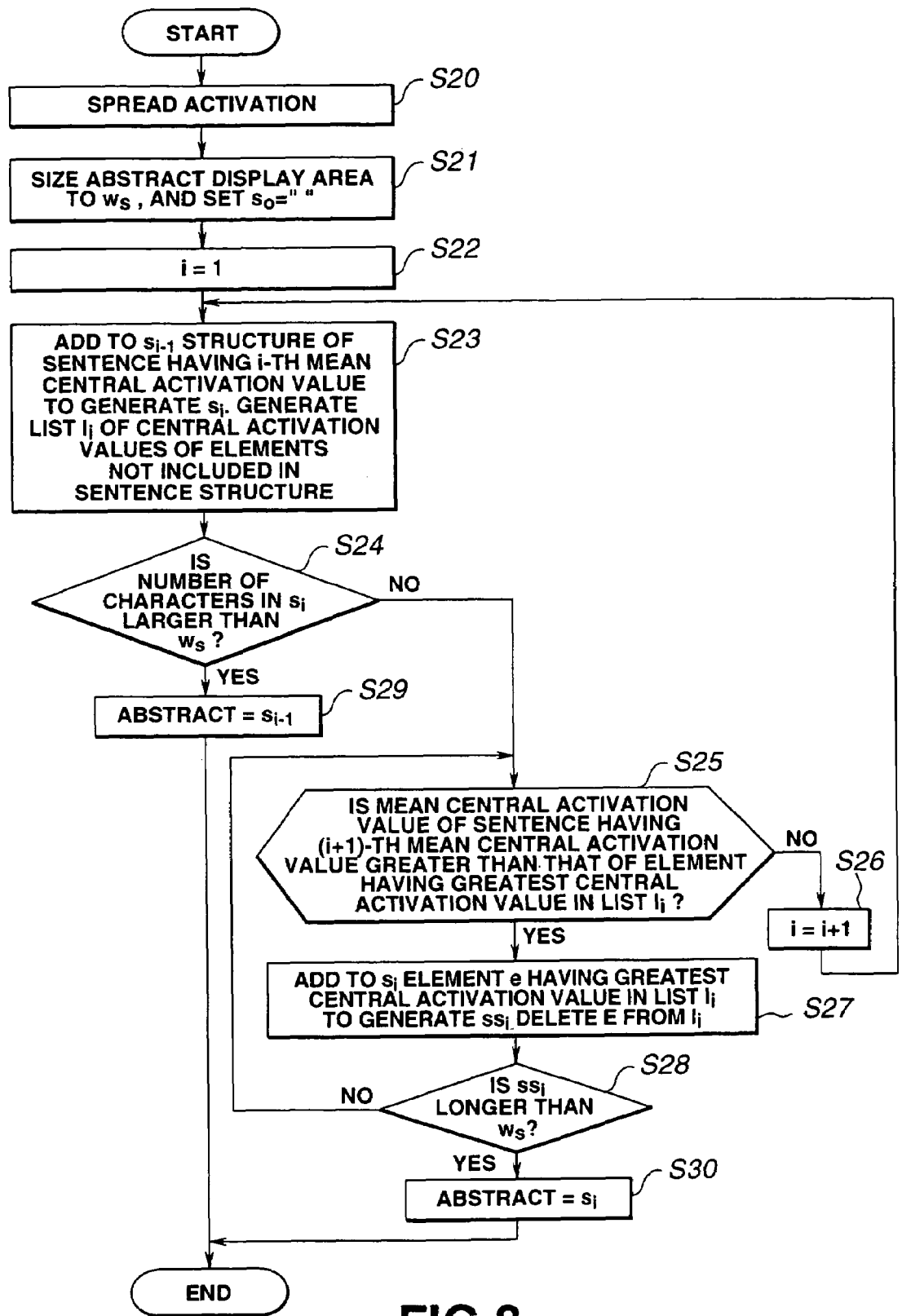
FIG. 8 is a flow chart of operations done in an abstract generation procedure.

At step S20 in FIG. 8, the controller 11 of the electronic document processor effects an activation propagation. In the embodiment of the present invention, a central activation value obtained by the activation propagation is adopted as a weighting factor to generate an abstract from a document. That is, by the activation propagation of a document of which the internal structure is tagged, it is possible to add to each element a central activation value corresponding to each tag added to the internal structure. The activation propagation is such that elements related to an element having a high central activation value is also given a high central activation value. Namely, in the activation propagation, an element expressed by araphora (coreference) and an antecedent one are equal in central activation value to each other, and each of other elements has the central activation value decreased towards a same value. Since the central activation value is determined according to a tag added to the internal structure, it can be used to analyze a document taking its internal structure in consideration.

Figure 4:
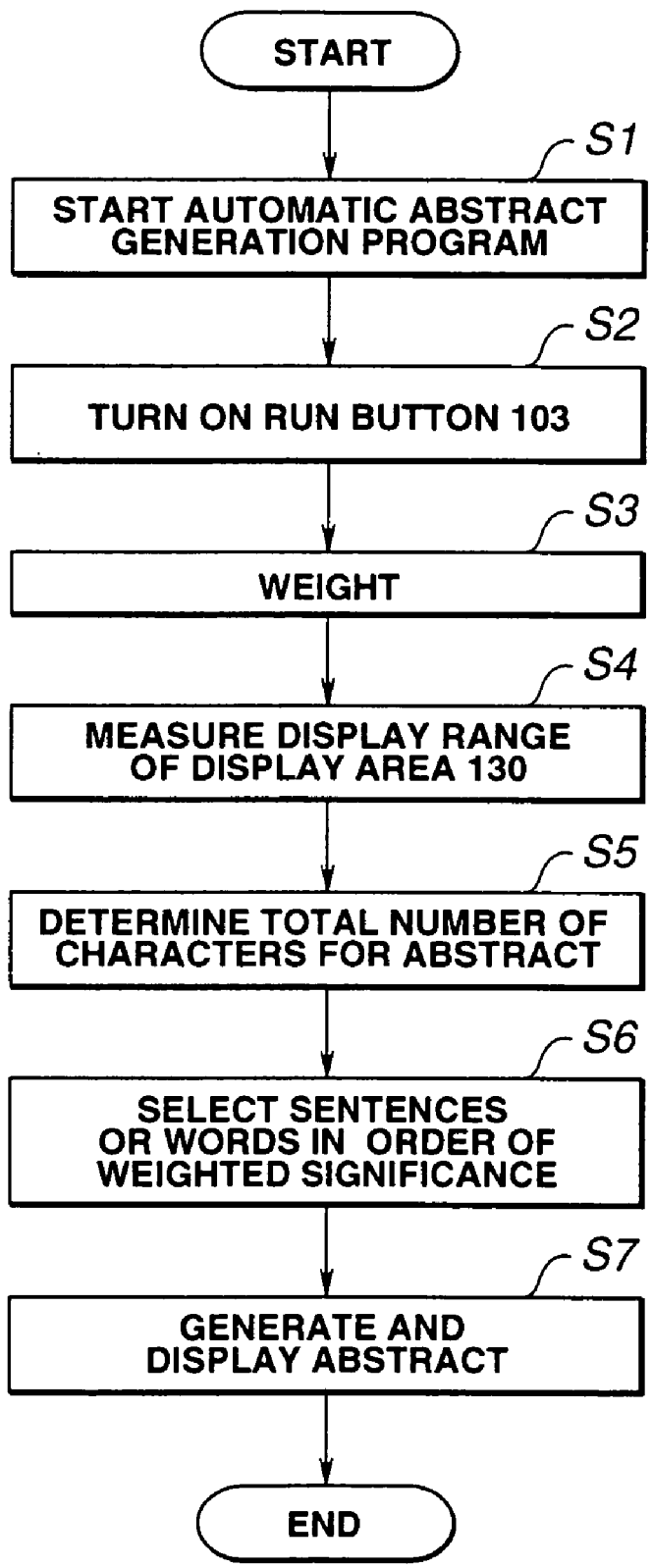
FIG. 4 is a flow chart of operations done in an abstract generation.

Note that step S20 corresponds to step S3 in FIG. 4 where the element is weighted. The weighting factor is a central activation value.

Figure 9:
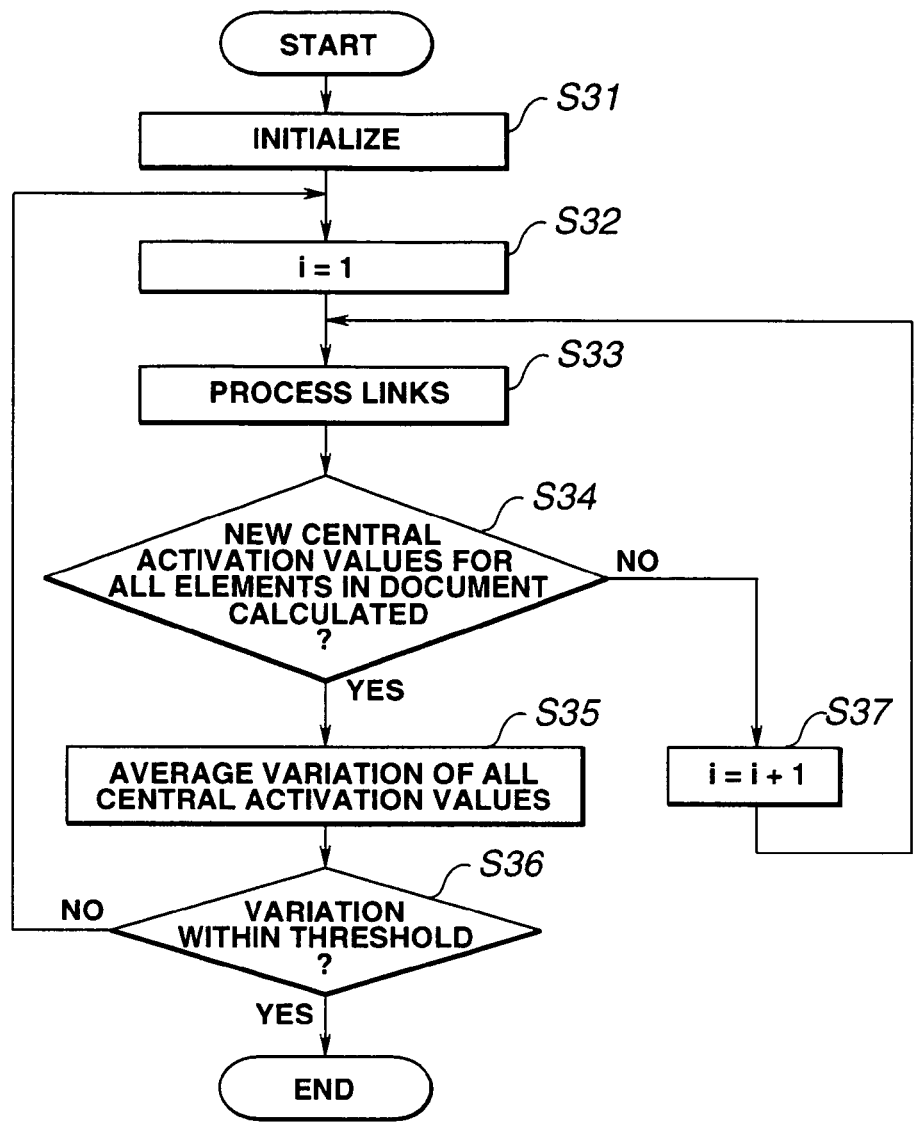
FIG. 9 is a flow chart of operations done in an activation propagation.

The activation propagation is effected following a series of steps in the flow chart in FIG. 9 under the control of the controller 11 of the electronic document processor.

First at step S31, the controller 11 initializes each of the elements in a document. The controller 11 assigns an initial value of central activation value to each of all the elements except for glossary elements and the glossary elements. For example, "1" should be assigned as the initial value of central activation value to all the elements except for the glossary elements, and "0" be assigned to each of the glossary elements. The controller 11 can assign nonuniform values to the initial values of central activation value of each element in advance to reflect the deviation of initial value on the central activation value obtained as a result of the activation propagation. By setting a high initial value of central activation value for an element in which the user is interested, for example, it is possible to obtain a central activation value reflecting the user's interest.

For reference and referred links connecting elements referring to and referred to by each other and normal links, the end-point activation value for an inter-element link is set zero. The controller 111 records the initial values of end-point activation value thus added into the RAM 14, for example.

At step S32 in FIG. 9, the controller 11 initializes a counter which counts elements $E_i$ composing together a document. Namely, the controller 11 sets the count i in the element counter to 1. That is, the counter refers to the first element $E_1$.

Figure 10:
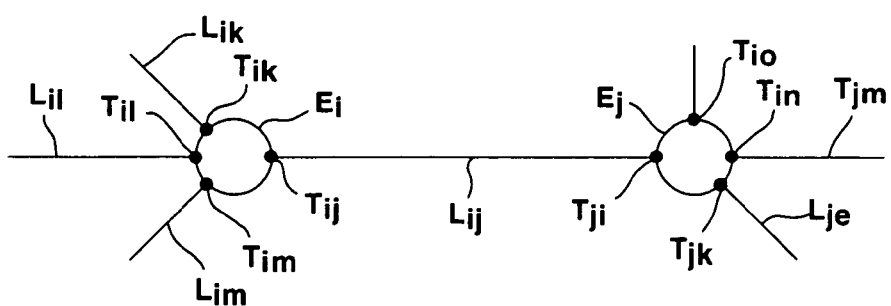
FIG. 10 explains the activation propagation.

FIG. 10 shows elements $E_i$ and $E_j$ forming a part of the elements and links forming together a document. The elements $E_i$ and $E_j$ have central activation values $e_i$ and $e_j$, respectively, connected to each other by a link $L_{ij}$. The end point $T_{ij}$ connecting to the element $E_i$ of the link $L_{ij}$ is connected at end points $T_{ji}$ to the element $E_j$. The element $E_i$ is connected to the element $E_j$ by the link $L_{ij}$ as well as to elements $E_k$, $E_l$ and $E_m$ (not shown) by links $L_{ik}$, $L_{il}$ and $L_{im}$, respectively. The element $E_j$ is connected by the link $L_{ji}$ to the element $E_i$ as well as to elements $E_p$, $E_q$ and $E_r$ by links $L_{jp}$, $L_{jq}$ and $L_{jr}$, respectively.

At step S33, the controller 11 executes a link processing in which new central activation values are calculated for an element the counter refers to. The link processing will further be described later.

At step S34, the controller 11 judges whether new central activation values for all the elements in the document have been calculated. When the calculation is complete, the controller 11 will make "YES" decision and go to step S35. If not, the controller will make "NO" decision and go to step S36.

More specifically, the controller 11 judges whether the count i in the counter has arrived at the total number of the elements in the document. When the count i has arrived at the total number, the controller 11 goes to step S35. If not, the controller 11 will go to step S37.

At step S37, the controller 11 increses the count i of the counter by one. The count of the counter is thus i+1. Thus the counter will refer to an (i+1)th element, namely, a next element. The controller 11 will return to step S32 to execute, for the (i+1)th element, the calculation of end-point activation values and a series of operations following the calculation.

More particularly, the controller 11 increments the count i of the counter by one. Thus, the counter will refer to an element next to the one for which the central activation value has been calculated at step S32.

At step S35, the controller 11 will average variations of central activation values for all the elements included in the document, that is, variations from the initial central activation values newly calculated, The controller 11 will read, for all the elements included in the document, the initial central activation values and newly calculated central activation values recorded in the RAM 14, for example. The controller 11 calculates a mean value of the variations of central activation values of all the elements by dividing the sum of variations of the newly calculated central activation values from the initial central activation values by the total number of the elements included in the document. The controller 11 will record, into the RAM 14, for example, the mean value thus calculated of the variations of the central activation values of all the elements.

At step S36, the controller 11 judges whether the mean value, calculated at step S35, of the variations of the central activation values of all the elements is within a predetermined threshold. When the mean variation is within the predetermined threshold, the controller 11 makes a "YES" decision and terminates the series of operations. If not, the controller 11 will make a "NO" decision and return to step S32 where it will set the count i of the counter to 1 and resume the series of operations for calculation of the central activation values of the elements in the document. Each time a loop from steps S32 to S36 is repeated, the variation will gradually be decreased.

Figure 11:
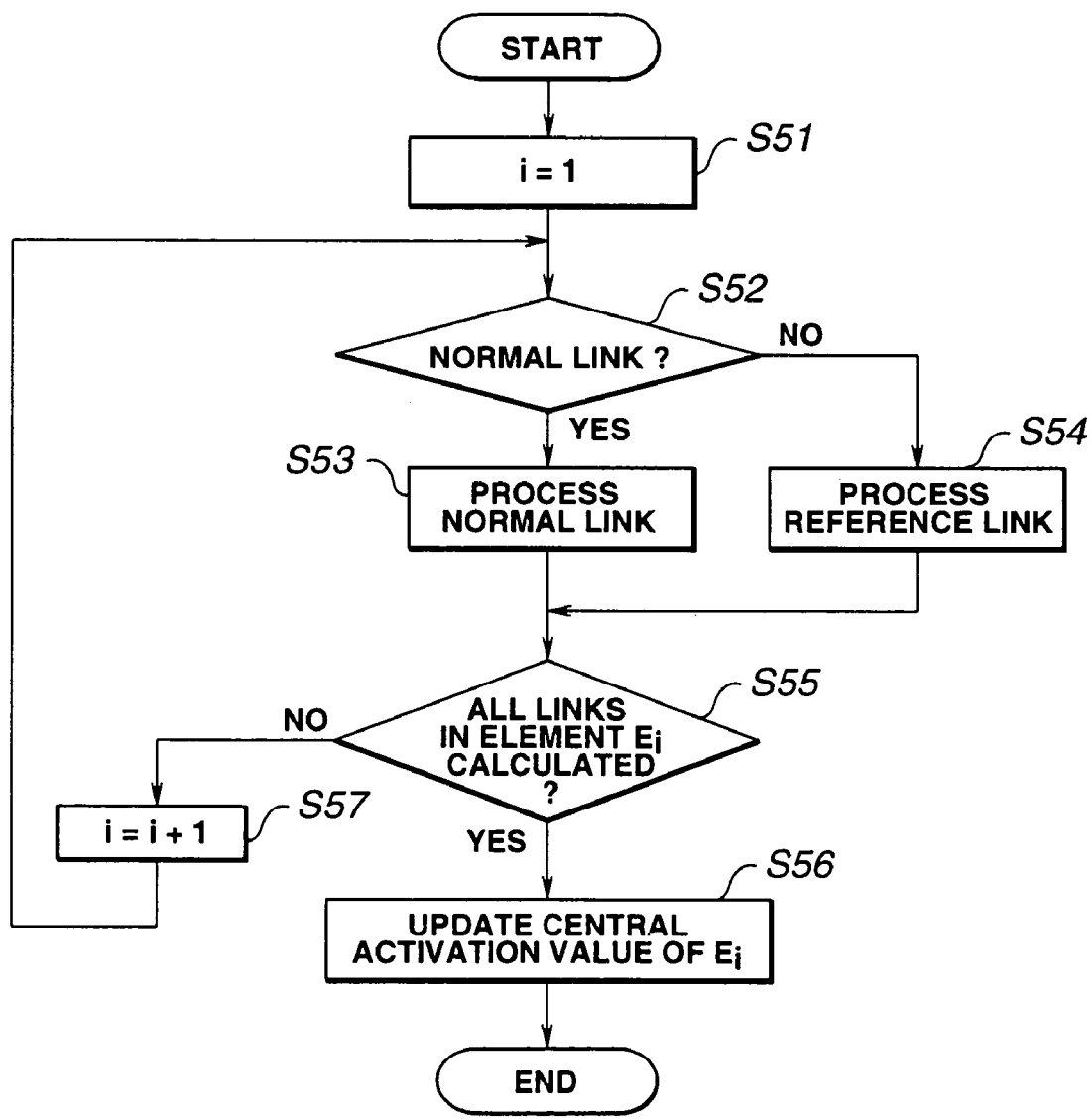
FIG. 11 is a flow chart of operations done in the link processing in the activation propagation.

Next, the link processing to be executed at step S33 where central activation values are calculated will be described in detail with reference to FIG. 11. Note that the flow chart in FIG. 11 applies to a link processing for one element $E_i$, but this link processing is done for all elements in a document.

At step S51, the controller 11 will initialize the counter which counts links connected at one end thereof to an element $E_i$ included in a document. That is, the controller 11 sets to 1 the count j of the counter which counts the number of such links. The counter refers to the first link $L_{ij}$ connected to the element $E_i$.

At step S52, the controller 11 refers to the tag to judge whether the link $L_{ij}$ connecting the elements Ei and Ej is a normal link. Namely, the controller 11 judges which the link $L_{ij}$ is, a normal link indicative of the relation among a glossary element corresponding to a word, sentence element corresponding to a sentence, paragraph element corresponding to a paragraph, etc. or a reference link indicative of the referring or referred relation. When the link $L_{ij}$ is a normal link, the controller 11 makes a "YES" decision and go to step S53. If no, the controller 11 makes a "NO" decision and go to step S54.

At step S53, a new end-point activation value is calculated for an end point $T_{ij}$ connected to the normal link $L_{ij}$ of the element $E_i$.

The judgment at step S52 has made it clear that the link $L_{ij}$ is a normal link. A new end-point activation value $t_j$ of the end point $T_{ij}$ connected to the normal link $L_i$ of the element $E_i$ is determined by adding end-point activation values $t_{jk}$, $t_{jl}$, $t_{jm}$, $t_{jn}$, $t_{jm}$ and $t_{jo}$ of all the end points connected to the links except for the link $L_{ij}$, of the end-point activation values of the element $E_j$, and a central activation value $e_j$ of the element $E_j$ to which the element $E_i$ is connected by the link $L_{ij}$, and dividing a value obtained by this addition by the total number of the elements included in the document.

The controller 11 reads an end-point activation value and central activation value from the data recorded in the RAM 14, for example. Concerning the read-out end-point and cental activation values, the controller 11 calculates a new end-point activation value for an end point connected to the normal link as in the above. The controller 11 records the new end-point activation value thus calculated into the RAM 14, for example.

At step S54, an end-point activation value for an end point $T_{ij}$ connected to the reference link of the element $E_i$ is calculated.

The judgment effected at step S52 has made it clear that the link $L_{ij}$ is a reference link. A new end-point activation value $t_{ij}$ for an end point $T_{ij}$ connected to the reference link $L_{ij}$ of the element $E_i$ is determined by adding the end-point activation values $t_{jk}$, $t_{jl}$, $t_{jn}$ and $t_{jo}$ and the central activation value $e_j$ of the element $E_j$ to which the element $E_i$ is connected by the link $L_{ij}$.

The controller 11 reads a necessary end-point and central activation value from the data recorded in the RAM 14, for example. Using the read-out end-point and central activation values, the controller 11 calculates a new end-point activation value for the end point connected to the reference link as in the above. The controller 11 records the end-point activation value thus calculated into the RAM 14, for example.

The normal link at step S53 and reference link at step S54 are processed for all the links $L_{ij}$ connected to the element $E_i$ to which reference is made by the count i as in the loop from steps S52 to S56.

At step S55, it is judged whether the end-point activation values $t_{ij}$ for all the links connected to the element $E_i$ are completely calculated. When the activation values have been calculated for all the links, the controller makes a "YES" decision and go to step S56. If not, the controller makes a "NO" decision and go to step S57.

At step S56, since it has been judged at step S55 that the end-point activation values $t_{ij}$ for all the links $L_{ij}$ of the element $E_i$ have been calculated, the central activation value $e_i$ of the element $E_i$ is updated.

A new central activation value, namely, an updated value, $e_i$ of the element $E_i$ is determined by calculating a sum $e_i'=e_i+\Sigma t_j'$ of the current central activation value $e_i$ of the element $E_i$ and the new end-point activation values for all the end points of the element $E_i$. The "'" means "new". The new central activation value is determined by adding the sum of new end-point activation values of an element to the initial central activation value of the element.

The controller 11 reads a necessary end-point activation value $t_{ij}$ from the data recorded in the RAM 14, for example. The controller 11 effects the above-mentioned calculation to provide a central activation value $e_i$ of the element $E_i$. Then the controller 11 records the central activation value $e_i$ thus calculated into the RAM 14, for example.

At step S21 following the aforementioned step S20 in FIG. 8, the controller 11 uses the result of activation propagation to set to $w_s$ the size of the lower display frame 130 of the window 100 on the display unit 30, more particularly, the maximum number of characters displayable in the lower display frame 130. The controller 11 initializes an abstract s to an initial value $s_0=$" ". This means that no string of characters exists in the abstract. The controller 11 records into the RAM 14 for example the maximum number $w_s$ of characters displayable in the lower display frame 130 and the initial value $s_0$ of the abstract s.

The step S21 corresponds to the measurement of the display range of the lower display frame 130 at step S4 and determination of total number of characters in the abstract at step S4. Namely, at step S21, the result of measurement gives a maximum number of characters $w_s$ displayable in the lower display frame 130.

At step S22, the controller 11 sets to zero the count i of the counter which counts the steps of abstract skeleton generation. That is, the controller 11 set the count to i=1. The controller 11 records the count i thus set into the RAM 14 for example.

At step S23, the controller 11 extracts, for the count i of the counter, a skeleton of a sentence having an i-th highest mean central activation value from a document from which an abstract is to be generated. The mean central activation value is a mean value of central activation value of elements composing one sentence. The controller 11 reads an abstract $s_{i-1}$ recorded in the RAM 14 for example, and adds to it a string of characters of the sentence skeleton extracted for the abstract $s_{i-1}$ to generate an abstract $s_i$. Then the controller 11 will record the abstract $s_i$ thus generated into the RAM 14 for example. Simultaneously, the controller 11 generates a list $l_i$ of the central activation values for the elements not included in the sentence skeleton, and records the list $l_i$ into the RAM 14 for example.

That is, at step S23, the controller 11 uses the result of activation propagation to select sentences in the descending order of their mean activation value magnitudes and extract skeletons of the selected sentences. A sentence skeleton is composed of essential elements extracted from a sentence. The essential elements include a head, elements having relative attributes such as subject, object, indirect object, possessor, cause, condition or comparison, and elements included directly in a coordinate structure of an element considered to an essential one as having a coordinate structure. The sentence elements are connected to form a skeleton and added to an abstract.

At step S24, the controller 11 judges whether the abstract $s_i$ is longer than the maximum number $w_s$ of characters in the lower display frame 130 of the window 100. If it is, the controller 11 makes a "YES" decision and terminates the series of operations. If not, the controller 11 will make a "NO" decision and go to step S25.

At step S29, the controller 11 sets the abstract to $s_{i-1}$ since it has been judged at step S24 that the number $s_i$ of characters in the abstract is larger than the maximum number $w_s$ of characters. In this case, the abstract $s_i=s_0=$" " is provided as an output. Therefore, no abstract will be displayed in this case. The controller 11 will terminate this series of operations.

At step S25, the controller 11 compares the central activation value of a sentence having an (i+1)th highest mean central activation value with the central activation value of an element having a lowest central activation value among the elements in the list $l_i$ generated at step S23. When the central activation value of the sentence having the (i+1)th highest mean central activation value is higher than the central activation value of the element having the lowest central activation value among the elements in the list $l_i$, the controller 11 makes a "YES" decision and proceeds to step S27. If not, the controller makes a "NO" decision and goes to step S26.

At step S26, the controller 11 increases the count i of the counter by one. Then the controller 11 returns to step S23.

At step S27, the controller 11 adds an element e having the highest central activation value in the list $l_i$ to the abstract $s_i$ to generate an abstract $ss_i$, and further deletes the element e from the list $l_i$. The controller 11 will record the abstract $ss_i$ thus generated into the RAM 14 for example.

Steps S22 to S28 correspond to steps S6 where sentences or words are selected in the descending order of weighted importance. Namely, at steps from S22 to S28, sentence skeletons or words are selected in the descending order of important, that is, central activation values.

At step S28, the controller 11 judges whether the number of characters in the abstract $ss_i$ is larger than the maximum number $w_s$, of characters in the lower display frame 130 of the window 100. If it is judged that the number of characters in the abstract $ss_i$ is larger than the maximum number $w_s$, the controller 11 makes a "YES" decision and terminates the series of operations. If it is not judged that the number of characters in the abstract $ss_i$ is larger than the maximum number $w_s$, the controller 11 will make a "NO" decision and return to step S25.

At step S30, the controller 11 sets an output abstract to $s_i$ since it has been judged at step S28 that the number of characters in the abstract $ss_i$ is larger than the maximum number $w_s$. Thus, an abstract sentence is generated so that its number of characters is not larger than the maximum number $w_s$ of characters. The controller 11 will terminate the series of operations.

Since an abstract is defined, steps S29 and S30 correspond partly to step S7 where an abstract is generated and displayed.

Figure 12:
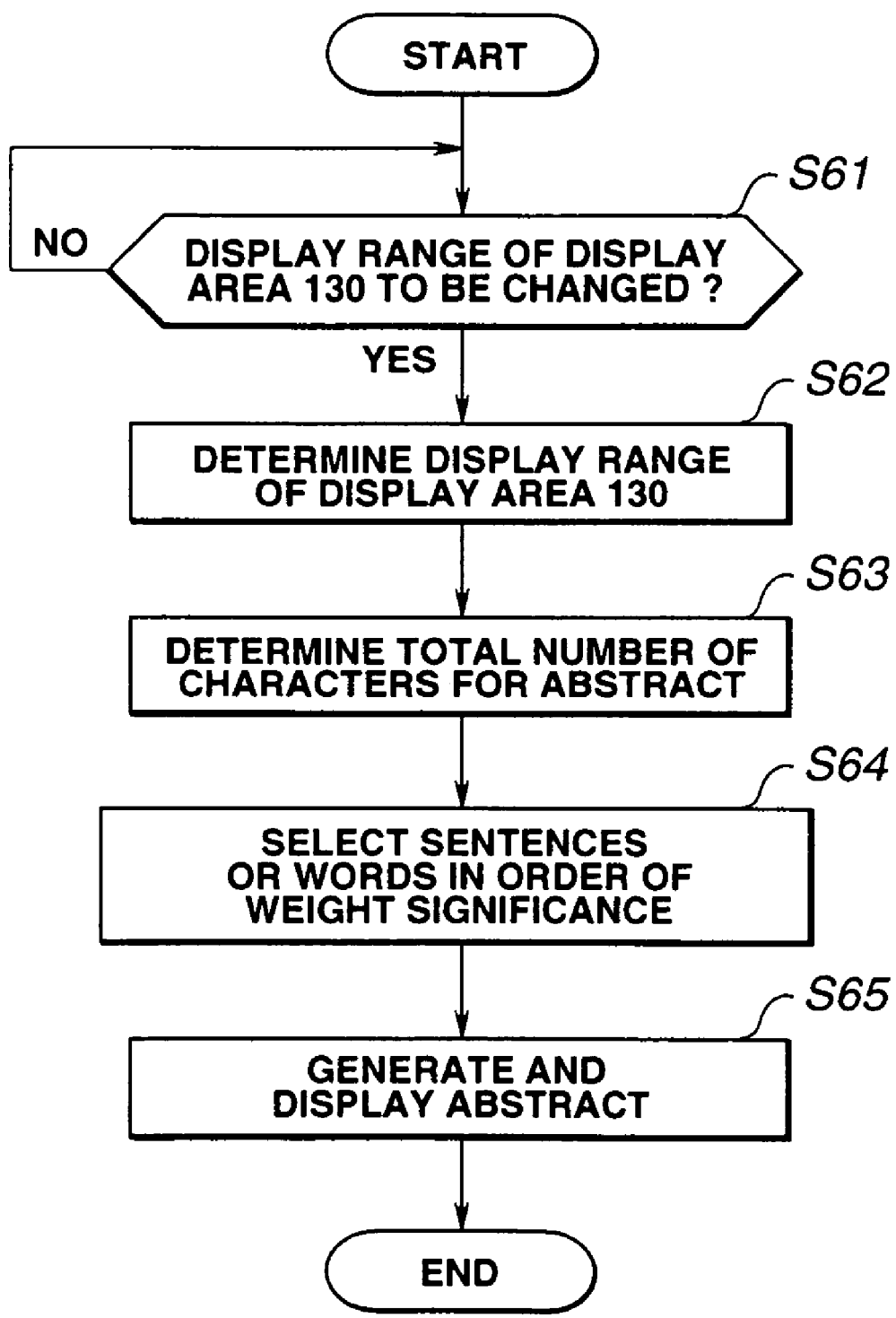
FIG. 12 is a flow chart of operations done in change of a display area.

When an abstract as in FIG. 7 is displayed in the lower display frame 130 of the window 100 on the display unit 30, the controller 11 operates to change the amount of information in the abstract as will be described below with reference to the flow chart in FIG. 12.

At step S61, the controller 11 waits until the display range of the lower display frame 130 of the window 100 on the display unit 30 is changed in response to an operation made by the user at the input unit 20. When the display range of the lower display frame 130 is changed, the controller 11 goes to step S62 where the display range is set and measured.

Figure 13:
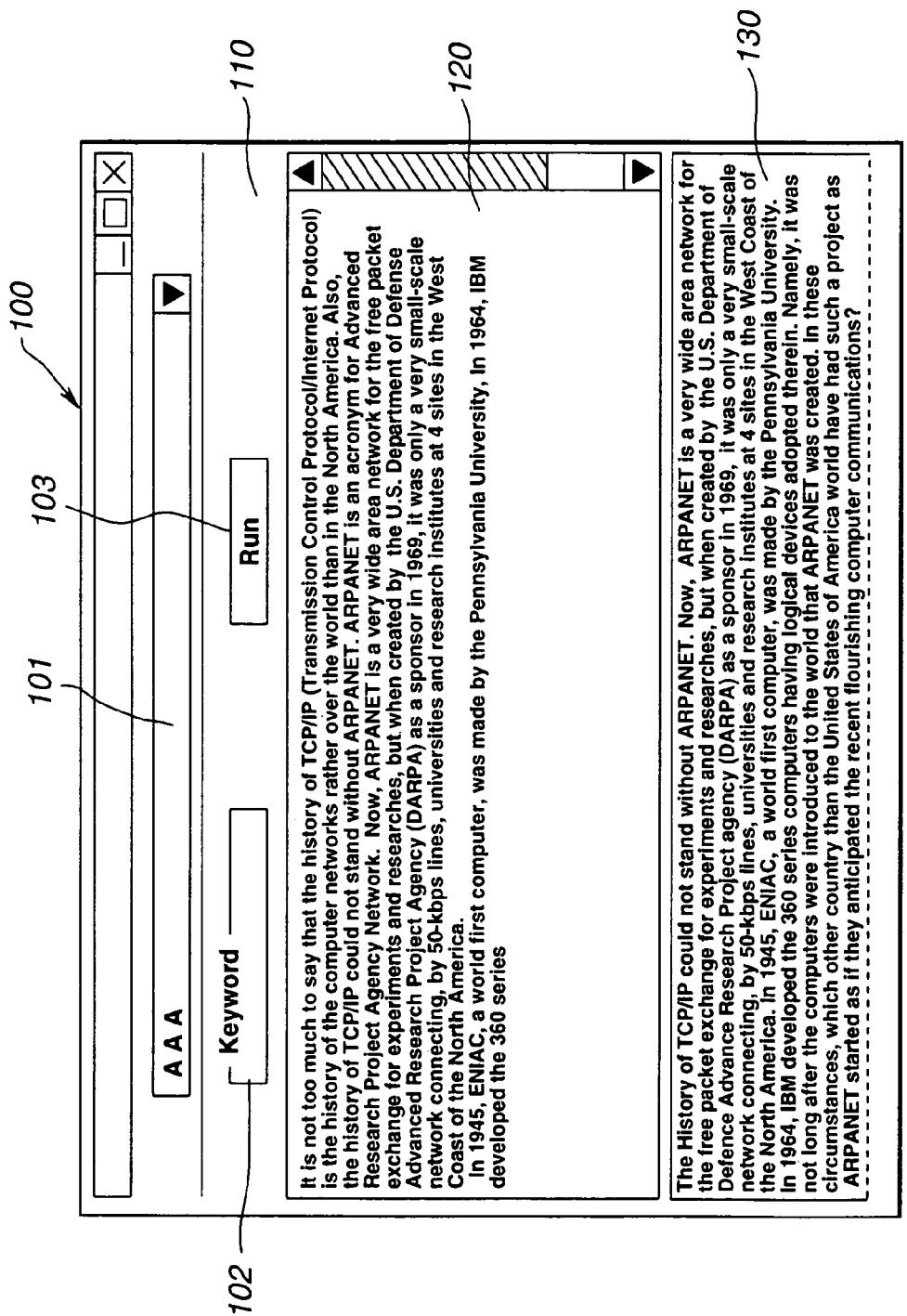
FIG. 13 is a window in which the document and its abstract are displayed.

Operations done at subsequent steps S63 to S65, similar operations to those at steps S5 to S7 in FIG. 4 are effected to generate an abstract fitting the display range of the lower display frame 130 and the operation is ended. For example, when the display range of the lower display frame 130 is widened by dragging the frame by the mouse, the further detailed abstract is generated as shown below, and displayed in the lower display frame 130 of the window 100 in FIG. 13.

"The history of TCP/IP could not stand without ARPANET. Now, ARPANET is a very wide area network for the free packet exchange for experiments and researches, but when created by the U.S. Department of Defense Advanced Research Project Agency (DARPA) as a sponsor in 1969, it was only a very small-scale network connecting, by 50-kbps lines, universities and research institutes at 4 sites in the West Coast of the North America. In 1945, ENIAC, a world first computer, was made by the Pennsylvania University. In 1964, IBM developed the 360 series computers having logical devices adopted therein. Namely, it was not long after the computers were introduced to the world that ARPANET was created. In these circumstances, which other country than the United States of America would have had such a project as ARPANET started as if they anticipated the recent flourishing computer communications?"

When a displayed abstract is too short to get understood the outline of the document, the user can widen the display range of the lower display frame 130 to refer to an abstract having more information.

Next, the recording medium according to the present invention will be described herebelow:

The recording medium is shown as indicated with a reference 32 in FIG. 1. The recording medium 32 has an internal hierarchical structure of a plurality of elements. It is a computer-readable recording medium recording an electronic document having attribute information tagged for the internal structure. The electronic document processing program includes a operation of setting a display area or frame for display of an electronic document abstract, an operation of determining a length of the abstract based on the size of the display area set by the setting operation, an operation of generating an electronic document abstract, and an operation of controlling for the generated abstract to be displayed in the display area.

In the aforementioned embodiment, the present invention has been described concerning an electronic document obtained via the Internet. However, the present invention is not limited to this embodiment, but it may be applied to a document taken out of a floppy disc, for example, to generate an abstract from the document.

In the aforementioned description, an example of tagging to a document has been described. The present invention is not of course limited to this method of tagging. Also, the embodiment of the present invention has been described concerning a document transmitted to the receiver 21 of the electronic document processor from outside. Of course, the present invention is not limited to this embodiment. For example, the electronic document processor according to the present invention can deal with a document recorded in the ROM 13 or read by the write/read unit 31 from the recording medium 32.

In the embodiment of the present invention having been described in the foregoing, the mouse was shown as one example of the pointing device usable with the present invention. However, the pointing device usable with the present invention is not limited only to a mouse. A stylus pen may also be used as the pointing device with the present invention.

The present invention permits to generate and display an abstract correspondingly to a display range of a display area, to thereby providing an abstract meeting the users' requirements.

What is claimed is:

1. An electronic document processor, comprising:
   means for variably setting a size of an abstract display area, in an entire display area, for display of an abstract to be generated from one or more electronic documents;
   means for allowing a user to (i) select desired portions of one or more electronic documents for generating the abstract only from the selected desired portions of said one or more electronic documents and (ii) enter any desired non-designated or non-programmed keyword in order to generate an abstract based on the desired non-designated or non-programmed keyword;
   means for determining a length of an electronic document abstract to be generated based on the abstract display area size set by the setting means and designated character size;
   means for generating the abstract having a length the depends on the length determined by the determining means,
   wherein the generating means generates the abstract by calculating a central activation value for each of the elements by activation propagation, calculating a mean value of central activation of each of the sentences, selecting sentences in the descending order of their mean activation value, extracting skeletons of the selected sentences, generating the abstract based on the skeletons;
   means for generating, from the one or more electronic documents, an abstract having a length which is a function of the length of the electronic document abstract and the weight of each element of the electronic document; and
   a display controlling means for displaying the abstract generated by the generating means in the abstract display area.

2. The electronic document processor as set forth in claim 1, wherein the one or more electronic documents have internal structures composed hierarchically of a plurality of elements, each of the elements being assigned a tag information indicative of their relation with other elements in the internal structures.

3. The electronic document processor as set forth in claim 2, wherein the generating means generates the electronic document abstract based on the tag information.

4. An electronic document processing method, comprising the steps of:

variably setting a size of an abstract display area, in an entire display area, for display of an abstract to be generated from one or more electronic documents;

allowing a user to (i) select desired portions of one or more electronic documents for generating the abstract only from the selected desired portions of said one or more electronic documents and (ii) enter any desired non-designated or non-programmed keyword in order to generate an abstract based on the desired non-designated or non-programmed keyword;

determining an electronic document abstract length based on the set abstract display area size and designated character size;

generating the abstract having a length that depends on the length determined by the determining means, wherein the generating step generates the abstract by calculating a central activation value for each of the elements by activation propagation, calculating a mean value of central activation of each of the sentences, selecting sentences in the descending order of their mean activation value, extracting skeletons of the selected sentences, generating the abstract based on the skeletons;

generating, from the one or more electronic documents, an abstract having a length which is a function of the length of the electronic document abstract and the weight of each element of the electronic document; and displaying the generated abstract in the abstract display area.

5. The method as set forth in claim 4, wherein the one or more electronic documents have internal structures composed hierarchically of a plurality of elements, each of the elements being assigned a tag information indicative of their relation with other elements in the internal structures.

6. The method as set forth in claim 5, wherein at the generating step, the electronic document abstract is generated based on the tag information.

7. A recording medium having a computer-readable electronic document processing program recorded therein, the electronic document processing program comprising the steps of:

variably setting a size of an abstract display area, in an entire display area, for display of an abstract to be generated from one or more electronic documents;

allowing a user to (i) select desired portions of one or more electronic documents for generating the abstract only from the selected desired portions of said one or more electronic documents and (ii) enter any desired non-designated or non-programmed keyword in order to generate an abstract based on the desired non-designated or non-programmed keyword;

determining an electronic document abstract length based on the set abstract display area size and designated character size;

generating the abstract having a length that depends on the length determined by the determining means, wherein the generating step generates the abstract by calculating a central activation value for each of the elements by activation propagation, calculating a mean value of central activation of each of the sentences, selecting sentences in the descending order of their mean activation value, extracting skeletons of the selected sentences, generating the abstract based on the skeletons;

generating, from the one or more electronic documents, an abstract having a length which is a function of the length of the electronic document abstract and the weight of each element of the electronic document; and displaying the generated abstract in the abstract display area.

* * * * *